L. C. LAZEAR.
STEERING WHEEL.
APPLICATION FILED OCT. 30, 1916.
1,377,420. Patented May 10, 1921.
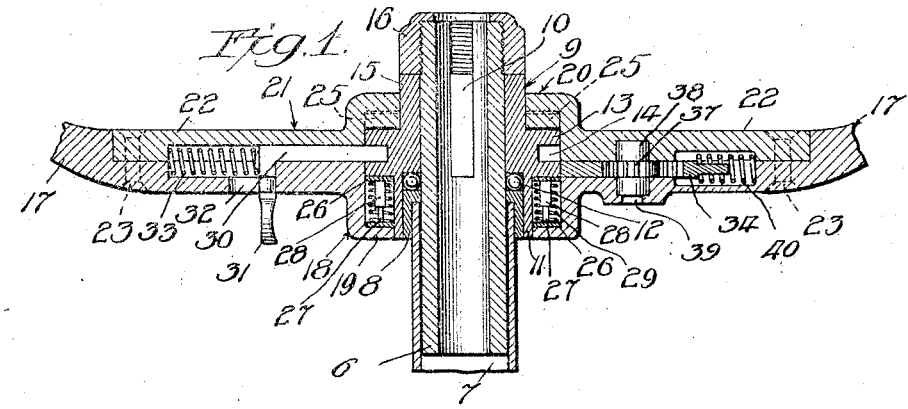
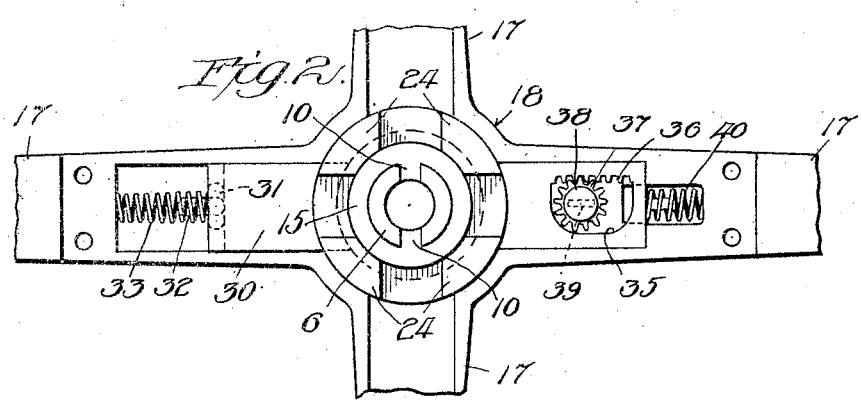
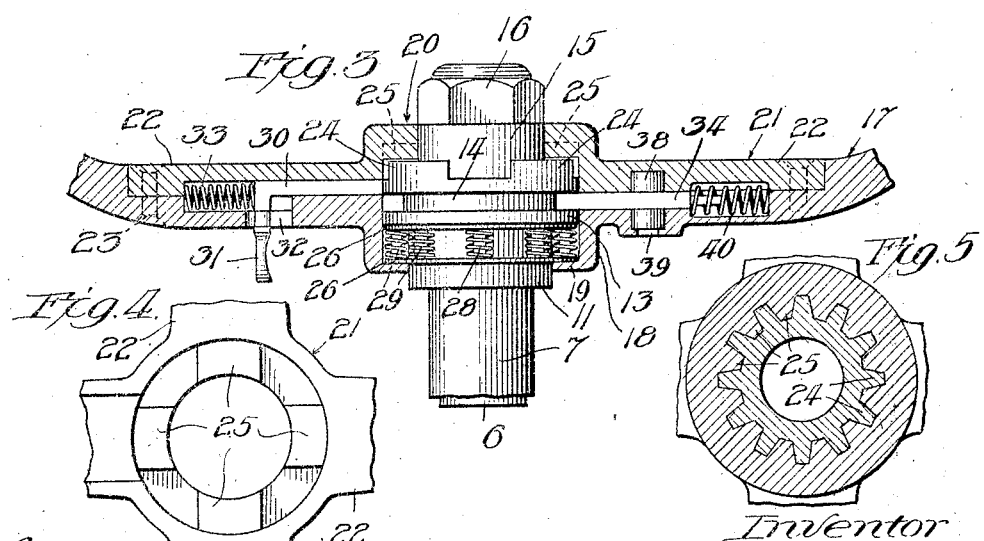
Inventor
Leroy C. Lazear

UNITED STATES PATENT OFFICE.

LEROY C. LAZEAR, OF CHICAGO, ILLINOIS.

STEERING-WHEEL.

1,377,420.  Specification of Letters Patent.  Patented May 10, 1921.

Application filed October 30, 1916. Serial No. 128,605.

*To all whom it may concern:*

Be it known that I, LEROY C. LAZEAR, a citizen of the United States, residing at Chicago, in the county of Cook and State of Illinois, have invented certain new and useful Improvements in Steering-Wheels, of which the following is a specification.

The present invention has to do with steering wheels for automobiles, motor boats, and the like, and is particularly concerned with means for interlocking the wheel with the steering apparatus, and with means by which this interlocking connection may be disestablished to render the steering wheel inoperative.

Various forms of steering wheel locks for automobiles and the like have heretofore been devised, usually involving the attachment of certain unsightly parts to the steering wheel or to the post upon which it is mounted. Such steering wheel locks, furthermore, are relatively complicated and oftentimes ineffectual, in that they perform inadequately their intended functions. In addition to the disadvantages that I have mentioned, it is usually not difficult for an unauthorized person to pick or tamper with such steering wheel locks, so that they fall short of their intended protection.

My improved steering wheel provides a connection with the steering apparatus which is substantially the same in appearance as the ordinary permanently locked wheel. It includes means, however, by which the wheel may be rendered operative or inoperative as desired. It is, furthermore, simple and positive in its action, and retains within its own body all of the operating elements necessary to effect the desired locking and unlocking actions. For these, as well as other reasons, it is practically proof against tampering. The present steering wheel, moreover, may be attached to the ordinary steering post without requiring special parts or accessories, in consequence of which it may be supplied as an ordinary adjunct to standard forms of steering apparatus for automobiles, motor boats, and the like. In operation it may be readily manipulated into unlocking condition, and at the same time is prevented from accidentally unlocking. In the interlocking connection between the wheel and steering apparatus the strains are evenly distributed over a number of contact points with the result that a strong, durable, and secure construction is provided, as will more fully hereinafter appear from the specification and claims. My invention includes these as well as numerous objects and advantages.

In the drawings:

Figure 1 is a cross section through the central portion of a steering wheel embodying the improvements of my invention, shown operatively secured to an automobile steering shaft;

Fig. 2 is a plan view, the spider plate being removed to exhibit the chambered portions of the wheel;

Fig. 3 is a transverse view similar to Fig. 1, certain of the parts being in elevation, the wheel in this instance being shown as unlocked from the shaft;

Fig. 4 is a fragmentary plan view of the under side of the spider plate; and

Fig. 5 is a cross section through a shaft and wheel exhibiting a modified construction of clutch members.

The present wheel is designed for attachment to an automobile steering apparatus of the kind now commonly employed and includes, among other elements, a shaft 6 arranged to revolve within a post or column 7. At the upper end of the column I have positioned a sleeve 8 having an inturned flange which rests upon the upper end of the column. A collar 9 is fitted upon the shaft and locked therewith by means of splines 10 entered into complementary slots. The collar is constructed with a depending flange portion 11 which surrounds the sleeve 8. Upon the flanged upper end of the sleeve anti-friction members 12 are arranged to facilitate rotary movement of the collar relative to the sleeve. Intermediate its ends the collar is formed with a flange 13 within which is an annular groove 14. A neck 15 extends upwardly from the upper end of the collar, and against this neck portion bears a cap 16 threaded onto the shaft extremity. In the arrangement of parts just described, the column and sleeve hold the collar from below, the cap holds it from above, while the spline locks it against rotary movement with respect to the shaft.

The steering wheel proper comprises the usual rim (not shown) carried upon spokes 17 which extend radially from a symmetrical hub portion 18. The wheel hub is somewhat thicker than the spokes which project therefrom, and is hollowed to provide a cylindrical chamber therewithin. The rear end of the hub is inturned as at 19 to form a lower closure, while its facing end is closed as at 20 by means of a spider plate 21 having arms 22 formed to overlie a portion of each of the spokes 17. Rivets 23, or other suitable means, may be employed to fasten the spider plate securely upon the wheel, and preferably so that it cannot be removed therefrom.

Upon the upper face of the collar flange 13 are a series of projections or teeth 24 (see Fig. 3) arranged to engage with complementary teeth 25 formed upon the under side of the spider plate 21. These teeth 24 and 25 may be shaped in various ways, examples of three different forms being suggested in Figs. 2, 4, and 5. When the teeth on the collar flange are interlocked with those on the spider plate, the wheel is fixedly locked to the shaft, so that it may be used for controlling the steering apparatus. The wheel may be unlocked from the shaft only when the teeth 24 are disengaged from the teeth 25 which, in the present invention, is effected by shifting the steering wheel longitudinally upon the shaft.

It will be noted from Figs. 1 and 3 that within the hub portion of the wheel is a space extending from the rear hub face 19 to the collar flange 13. Within this space I have provided a tension device for causing the wheel to normally remain in a fixed position longitudinally of the shaft where the teeth 24 and 25 are interlocked. For this purpose two rings 26 are utilized, one ring carrying a number of pins 27 and the other a corresponding number of sleeves 28, within which the pins 27 may telescope. Surrounding the pins and sleeves are coiled springs 29, which exert pressure upon the wheel to cause the teeth 24 and 25 to remain securely in engagement. It is only when a counter pressure is exerted upon the wheel sufficient to overcome the action of the springs 29 that the wheel can be unlocked from the shaft.

A positive lock for preventing accidental disengagement of the teeth 24 and 25 is also provided, consisting of a slidable locking plate 30 positioned within a suitable chamber within one of the spokes 17, the acting end of the plate being adapted to move inwardly within the annular groove 14 of the collar flange. Connected with the plate 30 is a finger piece 31 extending through a slot 32 preferably on the under side of the spoke, which the operator may readily move, when desired, to withdraw the locking plate from engagement with the annular groove 14. For the purpose of normally holding the plate 30 in locking position, a spring 33 is positioned within the chamber of the spoke, as clearly shown in the several figures of the drawing. The locking plate 30 acts positively to prevent the wheel from shifting its position longitudinally upon the shaft. When, however, the plate is retracted in the manner mentioned, the wheel may be shifted longitudinally of the shaft to a point where the teeth 24 and 25 are disengaged so as to render the wheel inoperative to control the steering apparatus.

It is desirable that means be provided for holding the wheel in shifted inoperative position for an indefinite period of time. For this purpose, I have provided in one of the wheel spokes a chamber in which is positioned a key controlled lock having a slide plate 34, the acting end of which may engage with the collar groove 14 only when the wheel is shifted sufficiently to be rendered inoperative. This plate 34 is formed with an opening 35 in its central position, one side of which is shaped to provide a rack 36 to be engaged by a pinion 37, as best shown in Fig. 2. The movement of this pinion is controlled by a suitable lock 38 positioned within the spoke chamber, and having a slot 39 through which a proper key may be entered. A spring 40 is arranged to normally hold the locking plate 34 in engagement with the groove 14. It will be observed that, as soon as the wheel is shifted sufficiently to become inoperative, the lock plate 34 will automatically be forced into the groove 14 to prevent a return movement of the wheel. It can be shifted back to locking position only through the use of a proper key coöperating with the lock 38 to cause a retraction of the locking plate from engagement with the collar groove 14. As soon as the wheel has been returned to its normal operating position, the safety locking plate 30 will automatically slide into the collar groove to lock the wheel against accidental shifting movement.

From the foregoing description, the operation of the present steering wheel will be readily understood. It is to be noted that the operative parts for connecting the wheel to the shaft are concealed from view and securely protected within the chambered portions of the wheel. It is of advantage also that the torsional strains communicated from the wheel to the shaft should be distributed over a number of points, instead of at but one or two places. The teeth 24 and 25 are preferably positioned around the periphery of the collar surface to distribute such strains over a number of points. While I have shown and described a collar locked to the shaft with which the wheel engages for the purpose of transmitting motion to the shaft, it is obvious that the collar might be formed integral with the shaft, or be dispensed with altogether. The use of the collar enables the present wheel to be readily adapted to the ordinary steering shaft. It is for this purpose chiefly that I have shown and described the collar as a component part of my invention. Other modifications and changes may doubtless be made without departing from the underlying principles of my invention, and I accordingly desire that such changes shall be included within the scope of the present invention.

I claim:

1. Steering apparatus embodying, in combination, a shaft, a grooved collar keyed to the shaft, a wheel shiftably and idly mounted upon the shaft, the wheel being formed with a chamber in its hub portion within which the collar is inclosed, interengageable clutch elements carried by the wheel and collar for interlocking the wheel and shaft when the wheel is shifted to a definite position longitudinally of the shaft, two tension actuated locking plates carried by the wheel arranged in different planes one adapted to enter the collar groove when the wheel is in locking position, and the other adapted to enter the collar groove when the wheel is in unlocking position, to prevent the wheel from shifting longitudinally upon the shaft, control means operable by a direct pull of the finger for withdrawing one locking plate, and control means operable by a key for withdrawing the other locking plate, from engaging relation with the wheel, substantially as described.

2. Steering apparatus embodying, in combination, a shaft, a grooved collar keyed to the shaft, a wheel shiftably and idly mounted upon the shaft, the wheel being formed with a chamber in its hub portion within which the collar is inclosed, interengageable clutch elements carried by the wheel and collar for interlocking the wheel and shaft when the wheel is shifted to a definite position longitudinally of the shaft, two tension actuated locking plates carried by the wheel arranged in different planes one adapted to enter the collar groove when the wheel is in locking position, and the other adapted to enter the collar groove when the wheel is in unlocking position, to prevent the wheel from shifting longitudinally upon the shaft, control means operable directly by the finger of the operator for withdrawing the first mentioned locking plate, and key controlled means for withdrawing the second locking plate from engaging position with the collar groove whereby the wheel may be shifted longitudinally upon the shaft, substantially as described.

3. Steering apparatus embodying, in combination, a shaft, a collar having a single groove keyed to the shaft, a spoked wheel shiftably and idly mounted upon the shaft, the wheel being chambered in its hub and spoked portions, and arranged to receive the collar within its hub chamber, interchangeable clutch elements carried by the wheel and collar for interlocking the wheel and shaft when the wheel is shifted to a definite position longitudinally of the shaft, two elements radially movable in different planes within the chamber portions of the wheel adapted one at a time to engage within the collar groove for positively holding the wheel in either locking or unlocking position upon the shaft, control means operable by a direct pull of the finger for withdrawing one locking plate, and control means operable by a key for withdrawing the other locking plate, from engaging relation with the wheel, substantially as described.

4. Steering apparatus embodying, in combination, a shaft, a collar keyed to the shaft, a wheel shiftably and idly mounted upon the shaft, the wheel being formed with a chamber in its hub portion within which the collar is inclosed, interengageable clutch elements carried by the collar and wheel arranged to interlock the wheel and shaft when the wheel is shifted to a definite position longitudinally of the shaft, tension controlled means disposed in one plane and operable by a direct pull of the finger for normally holding the wheel in locking position upon the shaft, and key controlled means disposed in another plane for holding the wheel in unlocking position upon the shaft, substantially as described.

5. Steering apparatus embodying, in combination, a shaft, a shiftable wheel idly mounted upon the shaft, interengageable clutch elements carried by the wheel and shaft arranged to interlock the wheel and shaft when the wheel is shifted to a definite position longitudinally of the shaft, tension means for normally holding the wheel in such locking position, means for positively holding the wheel in such locking position, means for retracting the positive holding means whereby the wheel may be shifted longitudinally upon the shaft to an unlocking position therewith, and key controlled means for holding the wheel in such unlocking position upon the shaft, substantially as described.

6. Steering apparatus embodying, in combination, a shaft, a shiftable wheel idly mounted upon the shaft, interengageable clutch elements carried by the wheel and shaft arranged to interlock the wheel and shaft when the wheel is shifted to a definite position longitudinally of the shaft, tension means for normally holding the wheel in such locking position, and key controlled means for holding the wheel in unlocking position upon the shaft against the action of the tension means, substantially as described.

7. Steering apparatus embodying, in combination, a shaft, a shiftable wheel idly mounted on the shaft, interengageable clutch elements carried by the wheel and shaft arranged to interlock the wheel and shaft when the wheel is shifted to a definite position longitudinally of the shaft, tension means for normally holding the wheel in such locking position, and other means positively acting to prevent the wheel from shifting away from such locking position, substantially as described.

8. Steering apparatus embodying, in combination, a shaft, a grooved collar connected to the shaft, a wheel shiftably and idly mounted upon the shaft, interengageable clutch elements carried by the wheel and collar for interlocking the wheel and shaft when the wheel is shifted to a definite position longitudinally of the shaft, two tension actuated locking plates disposed in different planes and both carried by the wheel one adapted to enter the collar groove when the wheel is in locking postion, and the other adapted to enter the collar groove when the wheel is in unlocking position, to prevent the wheel from shifting longitudinally upon the shaft, control means operable by a direct pull of the finger for withdrawing one locking plate, and control means operable by a key for withdrawing the other locking plate, from engaging relation with the wheel, substantially as described.

9. Steering apparatus embodying, in combination, a shaft, a wheel shiftably mounted on the shaft and arranged, when shifted to one position, to interlock with the shaft, and, when shifted to another position, to revolve idly thereupon, releasable retaining means carried by the wheel and disposed in one plane for holding the wheel in clutched relation with the shaft, control means therefor operable by a direct pull of the finger, other means carried by the wheel disposed in another plane for holding the wheel in idle position upon the shaft, and control means therefor operable by a key for permitting a change of wheel position upon the shaft, substantially as described.

10. Steering apparatus embodying, in combination, a shaft, a wheel shiftably mounted on the shaft, interengageable means carried by the wheel and shaft for clutching the one to the other when the wheel is shifted to one position upon the shaft, the wheel in another position being idle, means for maintaining the wheel in either of said two positions comprising two locking plates mounted to move radially upon the wheel but present their inner ends in different planes longitudinally of the shaft which is provided with a groove into which either plate end may enter, the one plate operating to hold the wheel in clutched relation, and the other plate in idle relation to the shaft, and separate control means for each plate one operable by a direct pull of the finger and the other by a key, substantially as described.

LEROY C. LAZEAR.

Witnesses:
 EPHRAIM BANNING,
 FRANCES M. FROST.